(12) United States Patent
Dawson et al.

(10) Patent No.: US 8,103,724 B2
(45) Date of Patent: Jan. 24, 2012

(54) METHOD AND PROGRAM PRODUCT FOR SECURING PRIVACY OF AN E-MAIL ADDRESS IN AN E-MAIL

(75) Inventors: Christopher J. Dawson, Arlington, VA (US); Barry M. Graham, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 11/428,887

(22) Filed: Jul. 6, 2006

(65) Prior Publication Data

US 2008/0010348 A1    Jan. 10, 2008

(51) Int. Cl.
*G06F 15/16* (2006.01)
*G06F 3/12* (2006.01)
*H04L 29/06* (2006.01)
*G08B 5/22* (2006.01)
*H04M 1/64* (2006.01)

(52) U.S. Cl. ....... 709/206; 358/1.15; 713/152; 713/165; 340/7.21; 379/88.19

(58) Field of Classification Search .......... 709/204–207, 709/217–219; 726/26–30
See application file for complete search history.

(56) References Cited

U.S. PATENT DOCUMENTS

| | | | | |
|---|---|---|---|---|
| 5,432,839 | A * | 7/1995 | DeLuca | 340/7.21 |
| 5,872,925 | A * | 2/1999 | Han | 709/206 |
| 6,161,181 | A | 12/2000 | Haynes, III et al. | |
| 6,591,291 | B1 * | 7/2003 | Gabber et al. | 709/206 |
| 6,829,631 | B1 | 12/2004 | Forman et al. | |
| 2001/0052073 | A1 * | 12/2001 | Kern et al. | 713/161 |
| 2002/0087641 | A1 * | 7/2002 | Levosky | 709/206 |
| 2002/0129111 | A1 * | 9/2002 | Cooper | 709/207 |
| 2002/0131566 | A1 * | 9/2002 | Stark et al. | 379/88.19 |
| 2003/0061289 | A1 * | 3/2003 | Clissold et al. | 709/206 |
| 2003/0142130 | A1 | 7/2003 | Kawaguchi et al. | |
| 2004/0019644 | A1 | 1/2004 | Fellenstein et al. | |
| 2004/0073616 | A1 * | 4/2004 | Fellenstein et al. | 709/206 |
| 2004/0088358 | A1 * | 5/2004 | Boda et al. | 709/206 |
| 2004/0230657 | A1 * | 11/2004 | Tomkow | 709/206 |

(Continued)

FOREIGN PATENT DOCUMENTS

WO    WO 02077773 A2 * 10/2002

*Primary Examiner* — Ian N Moore
*Assistant Examiner* — Kiet Tang
(74) *Attorney, Agent, or Firm* — William E. Schiesser; Ronald A. D'Alessandro; Keohane & D'Alessandro PLLC

(57) ABSTRACT

A method and program product for securing privacy of an e-mail address is provided. The method includes generating an e-mail message to one or more recipients on a sender e-mail client and encrypting, using a privacy plug-in installed on the sender e-mail client, an e-mail address of the sender, using a respective public key corresponding to each recipient. The method further includes transmitting the e-mail message to the recipients with the sender e-mail address encrypted and decrypting, upon receipt by a respective recipient e-mail client, the sender's e-mail address without displaying the sender's e-mail address. The transmitting step further includes stripping, before the e-mail is sent, an e-mail address of any other recipient besides the recipient to whom the e-mail is sent and sending a hyperlink to a web site for installing the privacy plug-in on a recipient client, such that the recipient can reply to the sender.

17 Claims, 10 Drawing Sheets

U.S. PATENT DOCUMENTS

| | | |
|---|---|---|
| 2005/0071632 A1* | 3/2005 | Pauker et al. ............... 713/165 |
| 2005/0114664 A1* | 5/2005 | Davin ............................ 713/170 |
| 2005/0160292 A1* | 7/2005 | Batthish et al. ............... 713/201 |
| 2005/0182954 A1 | 8/2005 | Decuir |
| 2005/0198170 A1 | 9/2005 | LeMay et al. |
| 2005/0204008 A1 | 9/2005 | Shinbrood |
| 2006/0007484 A1* | 1/2006 | Tanimoto ...................... 358/1.15 |
| 2006/0235930 A1* | 10/2006 | Thurlow ........................ 709/206 |

* cited by examiner

METHOD AND PROGRAM PRODUCT FOR SECURING PRIVACY OF AN E-MAIL ADDRESS IN AN E-MAIL

FIELD OF THE INVENTION

The present invention relates to the field of electronic mail (e-mail) communications and, more particularly, the invention relates to a method and computer program product for securing privacy of an e-mail address, in particular, securing privacy of a sender's e-mail address in an e-mail that is sent to one or more recipients.

BACKGROUND OF THE INVENTION

In today's business environment, organizations and/or businesses utilize electronic mail (e-mail) to communicate both internally within the organizations and/or businesses and externally with other organizations and/or businesses. Often, an initial e-mail originating from a sender gets forwarded to an unintended third party. This allows an unintended third party to send a response back to the sender, thus, subjecting the sender to receiving unnecessary responses to the initial e-mail. As such, there is a need for an efficient way to communicate electronically, so that e-mails and any contents can be managed efficiently.

SUMMARY OF THE INVENTION

In a first aspect of the invention, there is provided a method of securing privacy of a sender's e-mail address. The method includes generating an e-mail message to one or more intended recipients in an e-mail application on a sender e-mail client and encrypting, using a privacy plug-in installed on the sender e-mail client, an e-mail address of sender of the e-mail message that is generated. Further, the method includes transmitting the e-mail message generated with the e-mail address of the sender being encrypted to one or more intended recipients and decrypting, upon receipt by a respective recipient e-mail client corresponding to a respective recipient of the one or more intended recipients, the e-mail address of the sender without displaying the e-mail address of the sender in the e-mail message received by the respective recipient. In an embodiment, the encrypting step further includes selecting a privacy option for the e-mail message for securing the e-mail address of the sender and launching the privacy plug-in installed on the sender e-mail client for encrypting the e-mail address of the sender before transmitting the e-mail message to one or more intended recipients. In one embodiment the encrypting step further includes encrypting the e-mail address of the sender using a respective public key corresponding to the respective recipient of the one or more intended recipients. Further in an embodiment, the transmitting step further includes stripping an e-mail address corresponding to each of any other intended recipients before transmitting the e-mail message to the respective intended recipient, and sending a hyperlink to a web site for enabling an installation of a correct version of the privacy plug-in based on the respective recipient client being used by the respective recipient of the e-mail message transmitted. Preferably, the decrypting step further includes checking whether the correct version of the privacy plug-in is installed on the respective recipient client corresponding to the respective recipient of the e-mail message transmitted and if not, prompting the respective recipient to install the correct version of the privacy plug-in on the respective recipient client. In a preferred embodiment, the decrypting step further includes decrypting, using a respective private key corresponding to the respective recipient of the one or more intended recipients, the e-mail address of the sender in the e-mail message received by the respective recipient client. Moreover, the decrypting step further includes storing the e-mail address of the sender that is decrypted in a memory on a respective recipient e-mail client, such that the e-mail address of the sender is hidden when the e-mail message is received by each of the one or more intended recipients.

In another aspect of the invention, there is provided a method of securing privacy of an e-mail address in an e-mail message. The method includes installing a privacy plug-in on a sender e-mail client for securing an e-mail address. Further, the method includes generating an e-mail message to one or more intended recipients in an e-mail application on the sender e-mail client, selecting a privacy option provided by the privacy plug-in installed on the sender e-mail client and sending the e-mail message generated to each respective intended recipient of the one or more intended recipients, such that the e-mail address of the sender is encrypted and an e-mail address of each of any other intended recipients identified in the e-mail message is stripped before the e-mail message is sent to each respective intended recipient. The method further includes providing a hyperlink to a website for installing a correct version of the privacy plug-in on a respective recipient client corresponding to each of the one or more intended recipients for opening the e-mail message sent by the sender. In an embodiment, the sending step further includes encrypting the e-mail address of the sender using a respective public key corresponding to each respective recipient of the one or more intended recipients and stripping the e-mail address of each of any other intended recipients identified in the e-mail message received by each respective recipient, using a respective recipient public key corresponding to each of the any other intended recipients. The method further includes decrypting, upon receipt by the respective recipient e-mail client corresponding to the respective recipient of the one or more intended recipients, the e-mail address of the sender using a respective private key corresponding to the respective recipient while hiding the e-mail address of the sender in the e-mail message received by the respective recipient. Moreover, the method includes modifying the respective recipient e-mail client corresponding to the respective recipient of the e-mail message received, such that the e-mail address of the sender is stripped when the respective recipient forwards the e-mail message to an unintended recipient. In an embodiment, the decrypting step further includes checking whether the correct version of the privacy plug-in is installed on the respective recipient client corresponding to the respective recipient of the e-mail message transmitted and if not, prompting the respective recipient to install the correct version of the privacy plug-in on the respective recipient client. Additionally, the decrypting step further includes storing the e-mail address of the sender that is decrypted in a memory on a respective recipient e-mail client such that the respective recipient is able to reply to the sender of the e-mail message despite the e-mail address of the sender being hidden in the e-mail message received.

In yet another aspect of the invention, there is provided a computer program product for securing privacy of an e-mail address in an e-mail that is sent. The computer program product includes a computer readable medium, first program instructions to create an e-mail addressed to one or more intended recipients in an e-mail application on an e-mail client, the first program instructions comprising instructions to select a privacy option using a privacy plug-in installed on the e-mail client for securing an e-mail address. In an embodiment, the first program instructions include instructions to configure the privacy plug-in installed on the e-mail client to learn storage locations of each respective private key of one or more private keys corresponding to one or more respective recipients and to learn storage locations of each public key of one or more public keys corresponding to one or more respective recipients. The computer program product further includes second program instructions to encrypt the e-mail address of the sender using a respective public key of each respective recipient of the one or more intended recipients before sending the e-mail to each respective recipient of the one or more intended recipients. In an embodiment, the second program instructions further include instructions to strip an e-mail address corresponding to each of any other intended recipients before transmitting the e-mail message to the respective recipient, and further include instructions to send a hyperlink to a website for automatically downloading and installing a correct version of the privacy plug-in corresponding to each respective recipient client being used by each respective recipient of the one or more intended recipients. The computer program product also includes third program instructions to decrypt the e-mail address of the sender upon receipt of the e-mail by each respective recipient using a respective private key of each respective recipient of the one or more intended recipients. In an embodiment, the third program instructions include instructions to prompt each respective recipient e-mail client of each respective recipient of the one or more intended recipients to check if the correct version of the privacy plug-in is installed and, if not, to prompt each respective recipient to install the correct version of the privacy plug-in. Moreover, in an embodiment, the third program instructions include instructions to modify each respective recipient e-mail client corresponding to each respective recipient of the one or more intended recipients of the e-mail message, such that the e-mail address of the sender is stripped if the respective recipient forwards the e-mail message received to an unintended recipient. The computer program product further includes fourth program instructions to store in a memory on each respective recipient client corresponding to each respective recipient of the one or more intended recipients, the e-mail address of the sender that is decrypted without displaying the e-mail address of the sender that is decrypted in the e-mail message received by each respective recipient. Preferably, each of the first, second, third and fourth program instructions are stored on the computer readable medium.

Further, in yet another aspect of the invention, there is provided a process for deploying computing infrastructure that includes integrating computer-readable code into a computing system, wherein the code in combination with the computing system is capable of performing a process of securing privacy of an e-mail address. In an embodiment, the process includes installing a privacy plug-in on a sender e-mail client for securing an e-mail address of the sender, generating an e-mail message to one or more intended recipients in an e-mail application on the sender e-mail client, selecting, by the sender, a privacy option provided by the privacy plug-in installed on the sender e-mail client for securing the e-mail address of the sender and sending the e-mail message generated to one or more intended recipients, such that the e-mail address of the sender is encrypted using a respective public key corresponding to a respective recipient of the one or more intended recipients and an e-mail address corresponding to each of any other intended recipients is stripped before transmitting the e-mail message to the respective recipient. The process further includes providing a hyperlink to a website for installing a correct version of the privacy plug-in on the respective recipient client for opening the e-mail message sent by the sender. The process further includes decrypting, upon receipt by a respective recipient e-mail client corresponding to the respective recipient of the one or more intended recipients the e-mail address of the sender, while hiding the e-mail address of the sender in the e-mail message that is received by the respective recipient of the one or more intended recipients. The process further includes modifying the respective recipient e-mail client corresponding to the respective recipient of the e-mail message sent, such that the e-mail address of the sender is stripped if the respective recipient forwards the e-mail message to an unintended recipient.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
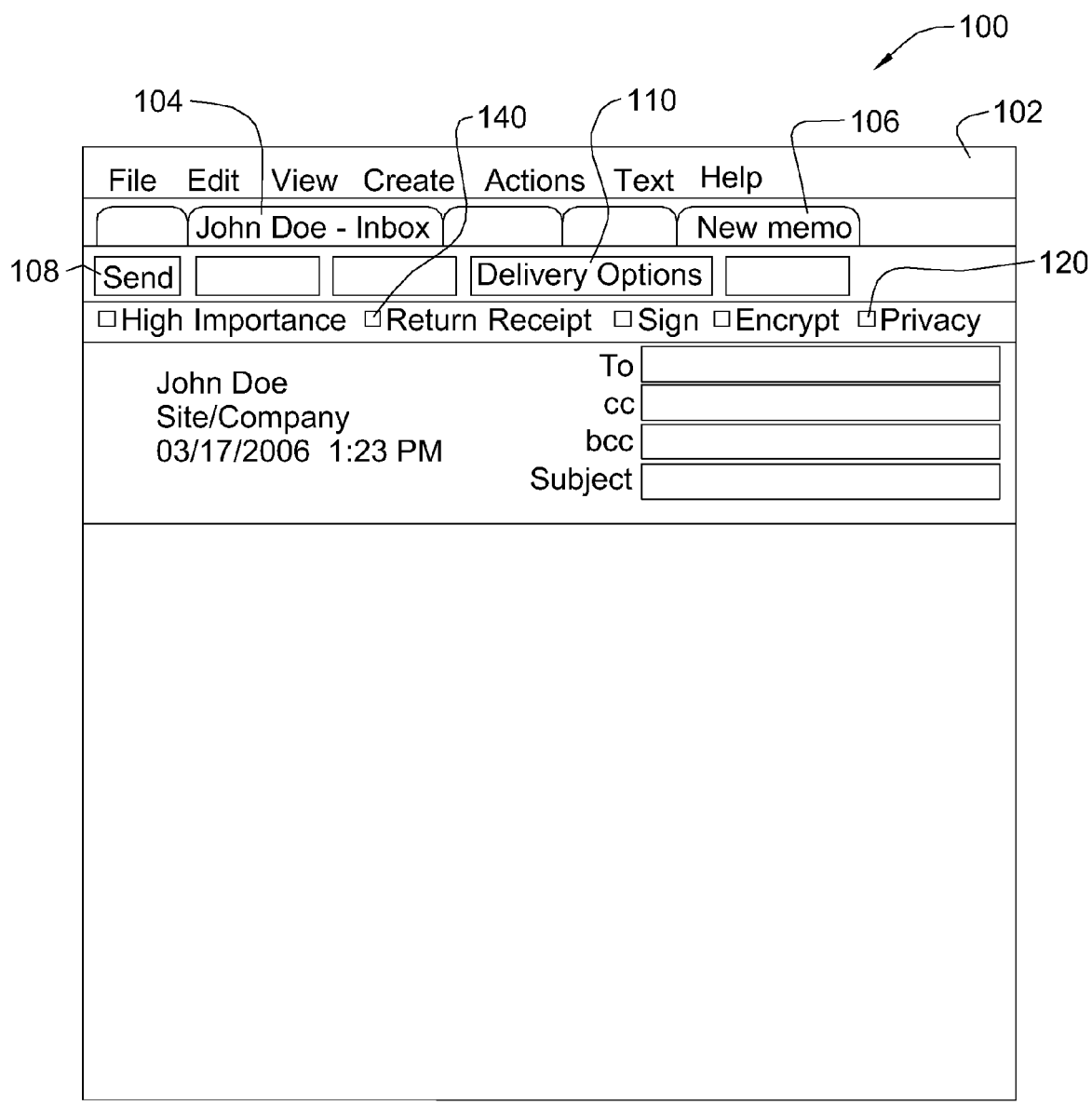
FIG. 1 is an illustration of a new e-mail composition window or screen in an e-mail application, in accordance with an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for securing privacy of a sender's e-mail address in an e-mail that is sent. The method comprises generating an e-mail message to one or more intended recipients in an e-mail application on a sender e-mail client and encrypting using a privacy plug-in installed on the sender e-mail client, an e-mail address of sender of the e-mail message that is generated. Further, the method comprises transmitting the e-mail message generated with the e-mail address of the sender being encrypted to the one or more intended recipients and decrypting, upon receipt by a respective recipient e-mail client corresponding to a respective recipient of the one or more intended recipients, the e-mail address of the sender without displaying the e-mail address of the sender in the e-mail message received by the respective recipient. In an embodiment, the encrypting step further comprises selecting a privacy option for the e-mail message for securing the e-mail address of the sender and launching the privacy plug-in installed on the sender e-mail client for encrypting the e-mail address of the sender before transmitting the e-mail message to the one or more intended recipients. In one embodiment, the encrypting step further comprises encrypting the e-mail address of the sender using a respective public key corresponding to the respective recipient of the one or more intended recipients. Further, in an embodiment, the transmitting step further comprises stripping an e-mail address corresponding to each of any other intended recipients before transmitting the e-mail message to the respective recipient, and sending a hyperlink to a web site for enabling an installation of a correct version of the privacy plug-in based on the respective recipient client being used by the respective recipient of the e-mail message transmitted. Preferably, the decrypting step further comprises checking whether the correct version of the privacy plug-in is installed on the respective recipient client corresponding to the respective recipient of the e-mail message transmitted and if not, prompting the respective recipient to install the correct version of the privacy plug-in on the respective recipient client. In a preferred embodiment, the decrypting step further comprises decrypting, using a respective private key corresponding to the respective recipient of the one or more intended recipients, the e-mail address of the sender in the e-mail message received by the respective recipient client. Moreover, the decrypting step further comprises storing the e-mail address of the sender that is decrypted in a memory on a respective recipient e-mail client, such that the e-mail address of the sender is hidden when the e-mail message is received by each of the one or more intended recipients.

As used herein, the term "e-mail" refers to an electronic mail composed using any e-mail application program, preferably, a commercially available e-mail application program, such as, the Lotus Notes® e-mail application program that is commercially available from International Business Machines Corporation (IBM). Also, the term "e-mail" or "e-mail message" or "original e-mail" or "initial e-mail" is intended to refer to an e-mail that is created or generated by a sender. Further, as used herein, as the term "intended recipient (s)" or "initial recipient(s)" or "specified recipient(s) refers to the recipient or recipients specified in any of the recipient groups or sections, such as the "To", group, the "cc" group or the "bcc" group of the original e-mail composed by a sender who selects the one or more intended recipients from a list of recipients in an address book or by entering an e-mail address. Moreover, the term unintended recipients" or "new recipient (s)" refers to any recipient that was not specified in any of the recipient groups of the original e-mail that was sent. Additionally, the term "recipient" is intended to include both an individual recipient as well as a group of individuals that are categorized together as one recipient.

Figure 2:
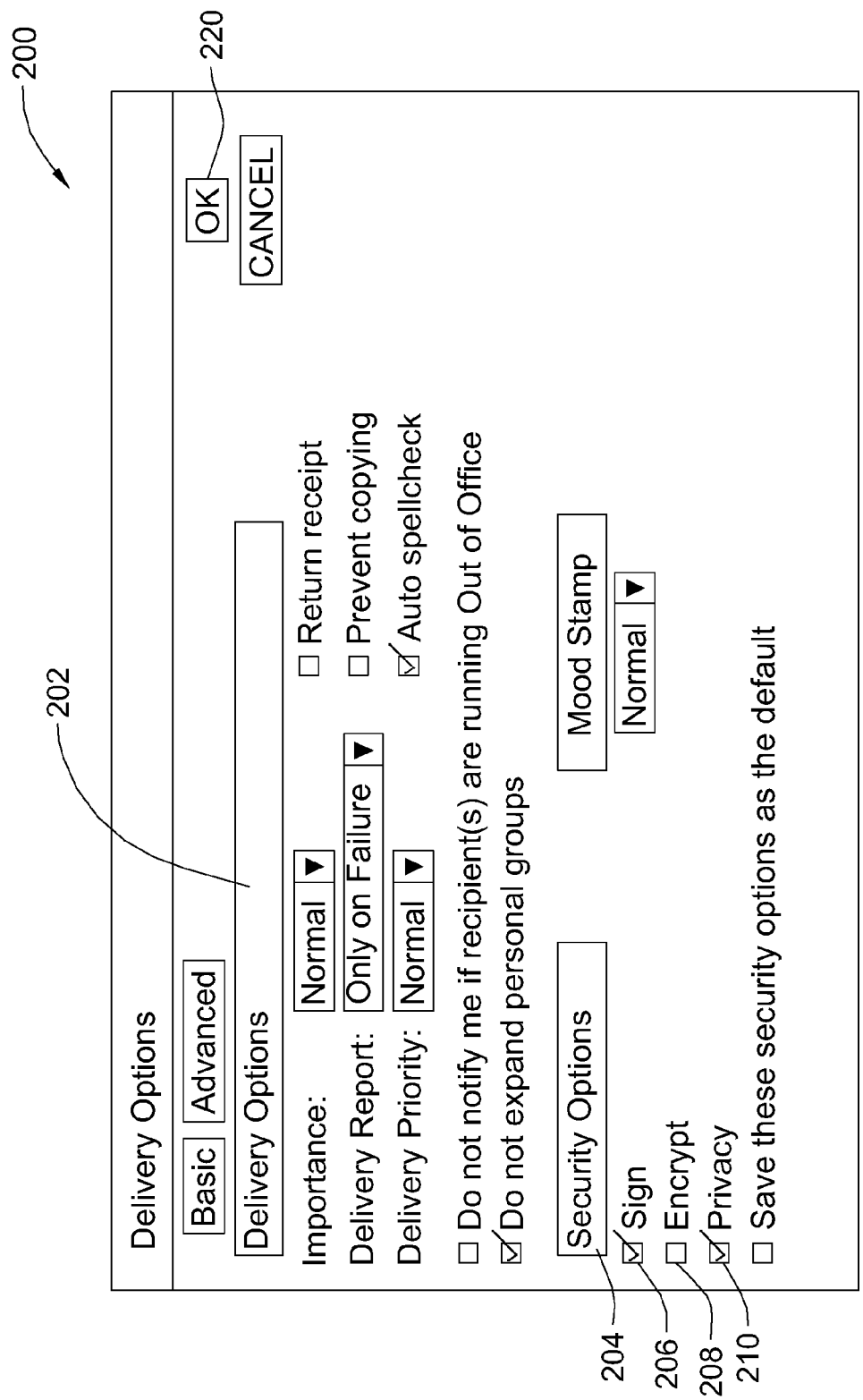
FIG. 2 is an illustration of a Delivery Options sub-window or sub-screen for selecting a privacy option for securing privacy of an e-mail address in an e-mail that is sent in accordance with an embodiment of the present invention.
Figure 3:
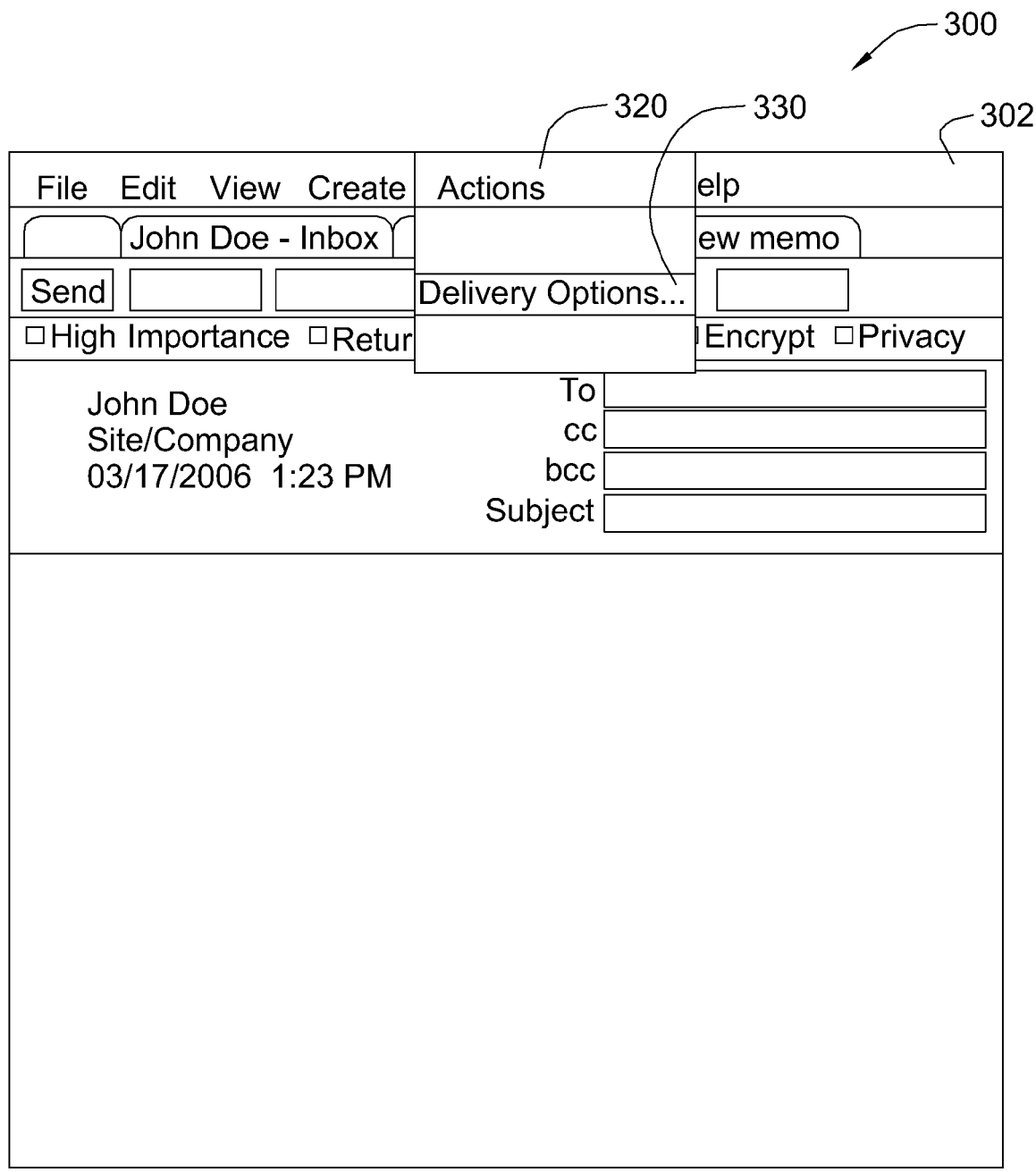
FIG. 3 is an illustration of a new e-mail composition window or screen in an e-mail application showing an alternate method for selecting a privacy option for securing privacy of an e-mail address in a e-mail that is sent, in accordance with an embodiment of the present invention.

Reference is now made to FIGS. 1 through 10, which illustrate a method of securing privacy of an e-mail address in an e-mail message created on an e-mail client on which a privacy plug-in has been installed, in accordance with an embodiment of the invention. Turning to FIG. 1, numeral 100 shows an e-mail composition window in an e-mail client for creating a new e-mail message. In particular, FIG. 1 shows a sender "John Doe" has chosen to create a new message or memo (as indicated by the "New Memo" tab 106 towards the top of the window 100) in his inbox (as indicated by the "John Doe—Inbox" tab 104). The new e-mail composition window 100 shows a main menu bar 102 at the top that contains the main menu items File, Edit, View, Create, Actions, Text and Help. Further, the new e-mail composition window 100 shows a "Send" button 108 for sending any e-mail message that is created and a "Delivery Options" button 110 for selecting various delivery and security options, such as, the delivery option box 140 labeled "Return Receipt" and the security option box 120 labeled "Privacy". In one embodiment, a sender, John Doe, can choose to secure privacy of his e-mail address by clicking on the Delivery Options button 110, which takes the sender to a Delivery Options menu screen 200, as shown in FIG. 2. The Delivery Options screen 200 shows several options under the Delivery Options bar 202 for an e-mail message when sending the e-mail message, such as, performing a spell check of the e-mail message (box labeled "Auto spellcheck") before sending the e-mail message or obtaining a return receipt from a recipient specified in the e-mail message (box labeled "Return receipt"). Further, as shown in FIG. 2, under the Security Options bar 204, the sender can choose several security options for the e-mail message. In particular, the sender can choose (and is shown to have chosen) a Sign option 206 by selecting or clicking on the Sign box 206 for obtaining digital signatures. Further, the sender can choose to encrypt the entire e-mail message by selecting the Encrypt box 208. Furthermore, the sender can choose and has chosen to select the Privacy box 210 for an e-mail message created on the sender's e-mail client that has installed on it the privacy plug-in. After the sender has selected the desired options, the sender clicks on the OK button 220, which takes the sender back to the e-mail message screen 100 shown in FIG. 1. In an alternative embodiment, as shown in FIG. 3 in the e-mail composition window 300, a sender could choose to secure privacy of the sender's e-mail address by pulling down the Actions sub-menu 320 on the Main menu bar 302. In the Actions sub-menu, among other options, is an option for Delivery Options 330 which a sender can select or click on in order to get to the Delivery Options screen 200 as shown in FIG. 2. Once a sender is at the Delivery Options screen 200 the sender proceeds to select delivery options under the Delivery Options bar 202 and/or security options under the Security Options bar 204, as described herein above.

Figure 4:
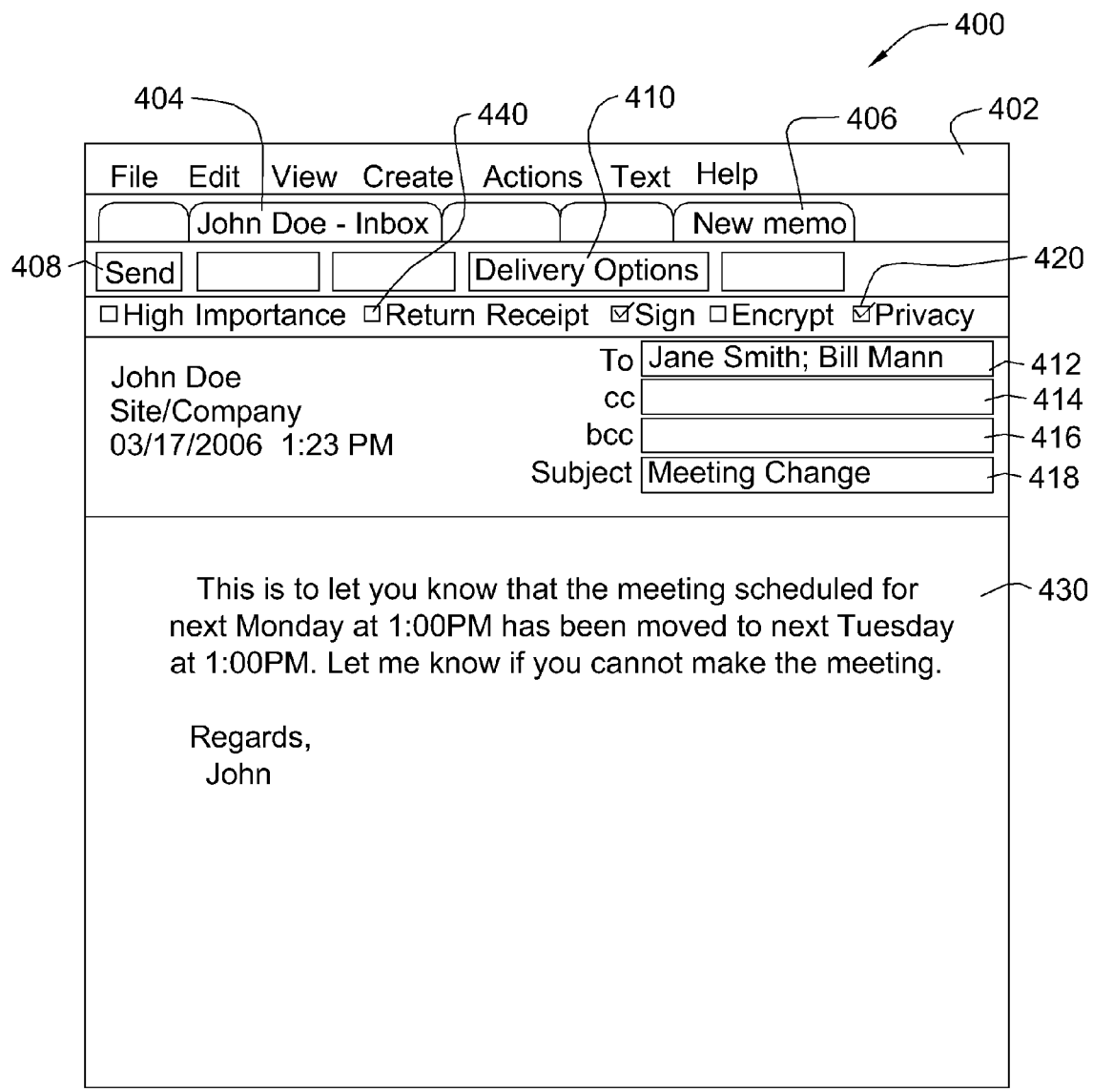
FIG. 4 is an illustration of a new e-mail message in an e-mail composition window or screen in an e-mail application showing intended recipients and showing that a privacy option has been selected, in accordance with an embodiment of the present invention.

Accordingly, once a sender has selected the privacy option for securing the sender's e-mail address, the sender is taken back to the e-mail composition window, which is now shown as reference numeral 400 in FIG. 4. As shown in FIG. 4, the e-mail composition window 400 shows the "New Memo" tab 406 towards the top of the window 400) in the sender. John Doe's, inbox (as indicated by the "John Doe—Inbox" tab 404). The e-mail composition window 400 shows a main menu bar 402 at the top that contains the main menu items File, Edit, View, Create, Actions, Text and Help. Further, the e-mail composition window 400 shows a "Send" button 408 for sending any e-mail message that is created and a "Delivery Options" button 410 for selecting various delivery and security options (as shown in FIG. 2), such as, for selecting a delivery option of obtaining a return receipt from a recipient (which is shown in the e-mail composition window 400 as box 440 labeled "Return Receipt", in FIG. 4) and for selecting a security option of securing privacy of a sender's e-mail address when sending an e-mail (shown as box 420 labeled "Privacy" in the e-mail composition window 400 of FIG. 4). In particular, the e-mail window 400 shows a Sign box with a check mark through it indicating that the sender has requested digital signatures and further shows a "Privacy" box 420 with a check mark through it indicating that the sender has selected the privacy option for securing privacy of an e-mail address in the e-mail message. Further, the e-mail window 400 shows that the sender has specified recipients in the To recipient group or section 412, but that no recipients have been specified for either of the cc section 414 or the bcc section 416. In particular, the e-mail composition window 400 shows the specified or intended recipients, namely, "Jane Smith" and "Bill Mann". In an embodiment, as shown in FIG. 4, the e-mail message only shows the names of each of the recipients specified in the To section 412. However, in an alternative embodiment (not shown in FIG. 4), the e-mail message can additionally display an e-mail address next to a recipient's name given that the sender's e-mail client already has the e-mail address or addresses corresponding to the specified or intended recipient or recipients stored on the sender's e-mail client. Moreover, as shown in FIG. 4, the e-mail composition window 400 shows that the sender has entered in the Subject section 418 the subject title "Meeting Change". Additionally, the sender has generated or created a message in the message section 430. Once the sender has finished composing the e-mail message, the sender selects or clicks on the Send button 408 to send the message.

When the sender of the e-mail message clicks on the Send button 408, the privacy plug-in that is installed on the sender's e-mail client is launched given that the sender has chosen the Privacy option box 210 in FIG. 2. As such, the privacy plug-in encrypts the sender's e-mail address before transmitting or sending the e-mail message to the intended recipients. In an embodiment, the e-mail address of the sender is encrypted using public-key infrastructure (PKI) cryptography. Further, in an embodiment, the privacy plug-in installed on the sender e-mail client is configured to learn storage locations of each respective private key of one or more private keys corresponding to one or more respective recipients and to learn storage locations of each public key of one or more public keys corresponding to the one or more respective recipients. In particular, the privacy plug-in installed on the sender's e-mail client encrypts the sender's e-mail address using a respective public key corresponding to a respective recipient specified in the e-mail. For the example shown in FIG. 4, the privacy plug-in encrypts the e-mail address of the sender, John Doe, in the e-mail message that is sent to the intended recipient, Jane Smith, using a public key of the recipient, Jane Smith. Similarly, the privacy plug-in encrypts the e-mail address of John Doe in the e-mail message that is sent to the intended recipient, Bill Mann, using a public key of the recipient, Bill Mann. Further, in an embodiment, the privacy plug-in sends or provides a hyperlink to a web site for enabling the installation of a correct version of the privacy plug-in on a recipient's client for decrypting the sender's e-mail address in order for a recipient to be able to reply to the sender of the e-mail message, as will be discussed herein below with reference to FIG. 5.

In another embodiment, the invention provides a method of securing privacy of an e-mail address in an e-mail message. The method comprises installing a privacy plug-in on a sender e-mail client for securing an e-mail address of the sender. Further the method comprises generating an e-mail message to one or more intended recipients in an e-mail application on the sender e-mail client, selecting a privacy option provided by the privacy plug-in installed on the sender e-mail client and sending the e-mail message generated to each respective intended recipient of the one or more intended recipients, such that the e-mail address of the sender is encrypted and an e-mail address of each of any other intended recipients identified in the e-mail message received by each respective intended recipient is stripped before the e-mail message is sent. The method further comprises providing a hyperlink to a website for installing a correct version of the privacy plug-in on a respective recipient client corresponding to each of the one or more intended recipients for opening the e-mail message sent by the sender. In an embodiment, the sending step further comprises encrypting the e-mail address of the sender using a respective public key corresponding to each respective recipient of the one or more intended recipients and stripping the e-mail address of each of any other intended recipients identified in the e-mail message received by each respective recipient, using a respective recipient public key corresponding to each of the any other intended recipients. The method further comprises decrypting, upon receipt by the respective recipient e-mail client corresponding to the respective recipient of the one or more intended recipients, the e-mail address of the sender using a respective private key corresponding to the respective recipient while hiding the e-mail address of the sender in the e-mail message received by the respective recipient. Moreover, the method comprises modifying the respective recipient e-mail client corresponding to the respective recipient of the e-mail message received, such that the e-mail address of the sender is stripped when the respective recipient forwards the e-mail message to an unintended recipient. In an embodiment, the decrypting step further comprises checking whether the correct version of the privacy plug-in is installed on the respective recipient client corresponding to the respective recipient of the e-mail message transmitted and if not, prompting the respective recipient to install the correct version of the privacy plug-in on the respective recipient client. Additionally, the decrypting step further comprises storing the e-mail address of the sender that is decrypted in a memory on a respective recipient e-mail client such that the respective recipient is able to reply to the sender of the e-mail message despite the e-mail address of the sender being hidden in the e-mail message received.

As explained hereinabove with respect to FIGS. 1-4, a sender creates an e-mail message on an e-mail client that has a privacy plug-in installed thereon, which e-mail is intended for one or more recipients that are specified in any of the To, cc and/or bcc section of the e-mail message. In particular, the sender selects the privacy option for the e-mail message as described hereinabove with respect to FIGS. 1-3. Further, the sender sends the created or generated e-mail message by clicking on the Send button 408 (in FIG. 4) from the sender's e-mail client. When the sender of the e-mail message clicks on the Send button 408, the privacy plug-in that is installed on the sender's e-mail client is launched given that the sender has chosen the Privacy option box 210 in FIG. 2. As such, the privacy plug-in encrypts the sender's e-mail address before transmitting or sending the e-mail message to the intended recipients. In particular the privacy plug-in installed on the sender's e-mail client encrypts the sender's e-mail address using a public key corresponding to a respective recipient specified in the e-mail to whom the e-mail is being sent. In an embodiment, the e-mail address of the sender is encrypted using public-key infrastructure (PKI) cryptography. Further, in an embodiment, the privacy plug-in installed on the sender e-mail client is configured to learn storage locations of each respective private key of one or more private keys corresponding to one or more respective recipients and to learn storage locations of each public key of one or more public keys corresponding to the one or more respective recipients. Furthermore, to each recipient that the e-mail is sent to, the privacy plug-in strips the e-mail addresses of any other recipients before sending the e-mail, so that one recipient cannot reply to another recipient. For instance, in the example shown in FIG. 4, the privacy plug-in encrypts the e-mail address of the sender, John Doe, in the e-mail message that is sent to the intended recipient, Jane Smith, using a public key of the recipient, Jane Smith. Further, in the e-mail that is sent to Jane Smith, the privacy plug-in strips Bill Mann's e-mail address, so that Jane Smith can only reply to John Doe and not to Bill Mann. Similarly, the privacy plug-in encrypts, for instance, using PKI cryptography, the e-mail address of John Doe in the e-mail message that is sent to the intended recipient, Bill Mann, using a public key of the recipient, Bill Mann. Further, in the e-mail that is sent to Bill Mann, the privacy plug-in strips Jane Smith's e-mail address so that Bill Mann can only reply to John Doe and not to Jane Smith. Further, in an embodiment, the privacy plug-in sends or provides a hyperlink to a web site for enabling the installation of a correct version of the privacy plug-in on a recipient's client for decrypting the sender's e-mail address in order for a recipient to be able to reply to the sender of the e-mail message, as will be discussed herein below with reference to FIG. 5.

Figure 5:
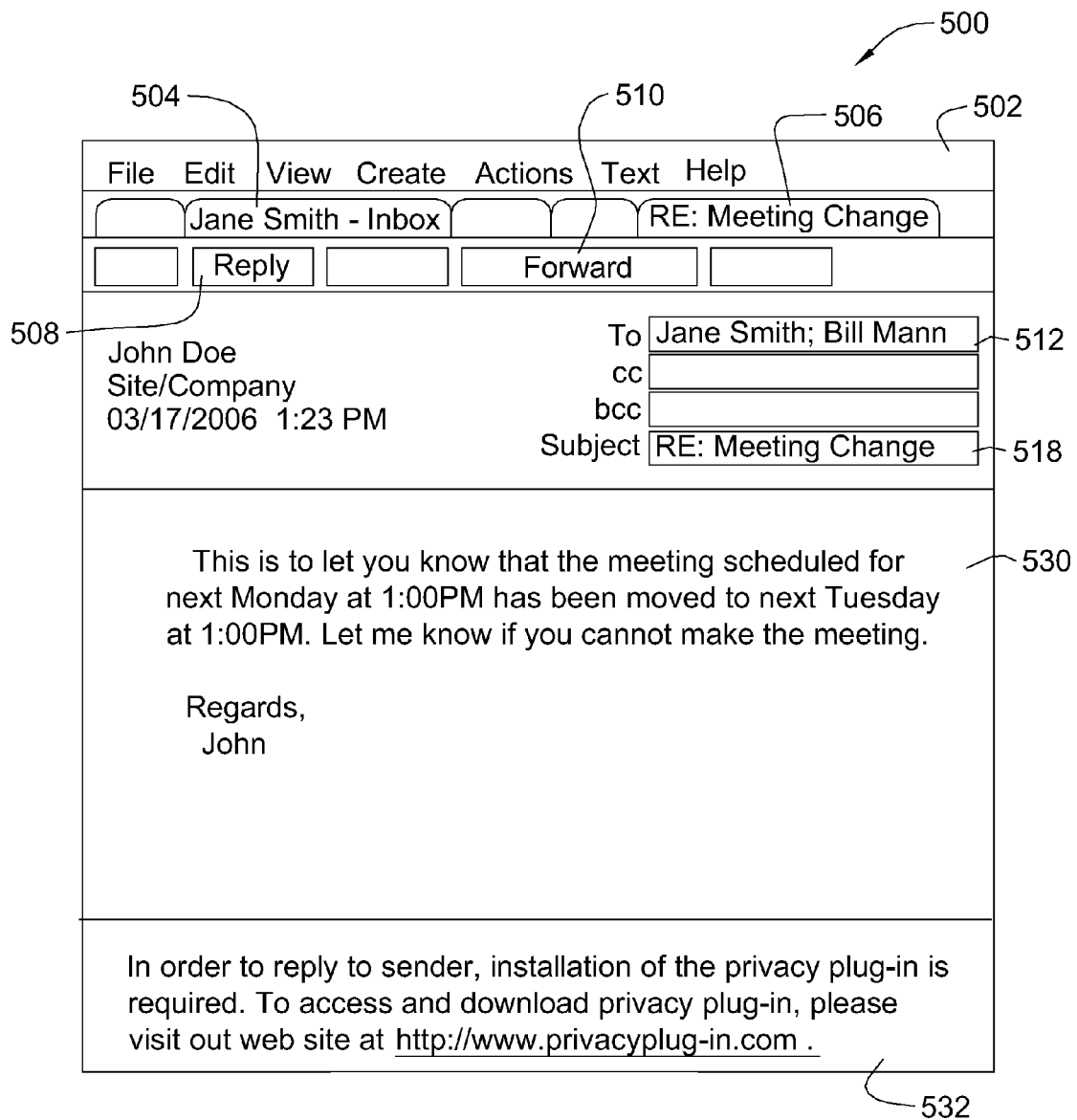
FIG. 5 is an illustration of an e-mail message that is sent and received by an intended recipient, showing a hyperlink, in accordance with an embodiment of the present invention.

Turning to FIG. 5, reference numeral 500 shows the e-mail message received (as indicated by the "RE: Meeting Change" tab 506 in the intended recipient, Jane Smith's inbox (as indicated by the "Jane Smith—Inbox" tab 504. The screen 500 shows a Main Menu bar 502 at the top that contains the main menu items File, Edit, View, Create, Actions, Text and Help. Further, FIG. 5 shows that the recipient can choose to reply to the e-mail message received by selecting or clicking on the Reply button 508 or choose to forward the e-mail message received by selecting or clicking on the Forward button 500. The recipient e-mail window of the e-mail message received shows in the to section 512 the names of the intended recipients specified in the e-mail message that was sent by John Doe, namely, Jane Smith and Bill Mann, but does not include the e-mail addresses for either of the intended recipients in the To section 512, corresponding to the manner in which the To section 412 was displayed in the e-mail message 400 sent. Further, the e-mail window 500 shows the title "RE: Meeting Change" in the Subject section 518 along with the e-mail message that was received in section 530. Furthermore, the e-mail window 500 also shows a hyperlink message 532 that contains a hyperlink to a web site, which was provided by the privacy plug-in when the e-mail 400 was transmitted from the sender's e-mail client. In particular, the hyperlink message 532 informs the recipient, in this case, Jane Smith, that installation of the privacy plug-in is required before Jane Smith can reply to the sender, John Doe, or send the e-mail message received to a third party. In an embodiment, if a privacy plug-in version has already been installed on a client, before a recipient can read the e-mail that is sent, the privacy plug-in automatically and transparently launches the hyperlink to a web site for checking whether a correct version of the privacy plug-in is installed, so that a recipient can receive the e-mail message (without the hyperlink) and still can reply to the sender. The hyperlink message 532 contains a hyperlink to a web site, for instance, http://www.privacyplug-in.com. Alternatively, the e-mail message received can contain a hyperlink to a different web site suitable for installation of the privacy plug-in. Also, referring to FIG. 4, if the e-mail addresses of the intended recipients had been included next to the names of the recipients in the To section 412 of FIG. 4 (not shown in FIG. 4), even then the To section 512 of the e-mail message received by any intended recipient would not display the e-mail address of each of any other intended recipients next to their names, given that the privacy plug-in would have stripped the e-mail addresses corresponding to the other recipients so that any intended recipient who receives the e-mail message cannot reply to any other recipients identified in the e-mail but rather can only reply to the sender who sent the initial e-mail message. In the example shown in FIG. 5, Jane Smith, the intended recipient who has received John Doe's e-mail message cannot reply to the other recipient, Bill Mann (or to any other recipients, if other recipients had been specified by John Doe), but can only reply to the sender, John Doe. If the privacy plug-in is already installed on the recipient's e-mail client, then, in an embodiment, the privacy plug-in checks whether a correct version of the privacy plug-in is installed on the recipient e-mail client and, if not, the privacy plug-in prompts the recipient to install the correct version of the privacy plug-in on the recipient e-mail client, as will be discussed herein below with respect to FIG. 9.

Further, referring to the e-mail message received in FIG. 5, once the privacy plug-in has been installed on the recipient client, the recipient can either reply to the sender of the e-mail message (by selecting the Reply button 508) or forward the e-mail message to a third party (by selecting the Forward button 510). For example, if the recipient, Jane Smith, wants to reply to the e-mail message received, the recipient, Jane Smith selects or clicks on the Reply button 508, which takes the recipient, Jane Smith to the screen 600 shown in FIG. 6, as discussed herein below. In an embodiment, when the recipient, Jane Smith, replies to the e-mail message 500 by selecting or clicking on the Reply button 508 shown in FIG. 5, the privacy plug-in will automatically decrypt the e-mail address of the sender, John Doe, using Jane's private key and the privacy plug-in will automatically store the decrypted e-mail address of the sender, John Doe on the recipient, Jane Smith's e-mail client, so that John's decrypted e-mail address can be inserted into Jane's reply e-mail message when the reply e-mail message is transmitted to John. In an embodiment, the e-mail address of the sender is decrypted using public-key infrastructure (PKI) cryptography. Further, the privacy plug-in would have stripped Bill Mann's e-mail address in the e-mail that is delivered or sent to Jane, so that Jane cannot reply to Bill. Similarly, when the privacy plug-in has been installed on Bill Mann's e-mail client, Bill can either reply or forward the e-mail message that is received. If Bill Mann chooses to reply (not shown in any of the drawings), the privacy plug-in will automatically decrypt, for instance, using PKI cryptography, the e-mail address of the sender, John Doe, using Bill's private key and the privacy plug-in will automatically store John's decrypted e-mail address on Bill's e-mail client, so that John's decrypted e-mail address can be inserted into Bill's reply e-mail message when the reply e-mail message is transmitted to John. Again, the privacy plug-in would have stripped Jane's e-mail address in the e-mail that is delivered or sent to Bill, so that Bill cannot reply to Jane.

Figure 6:
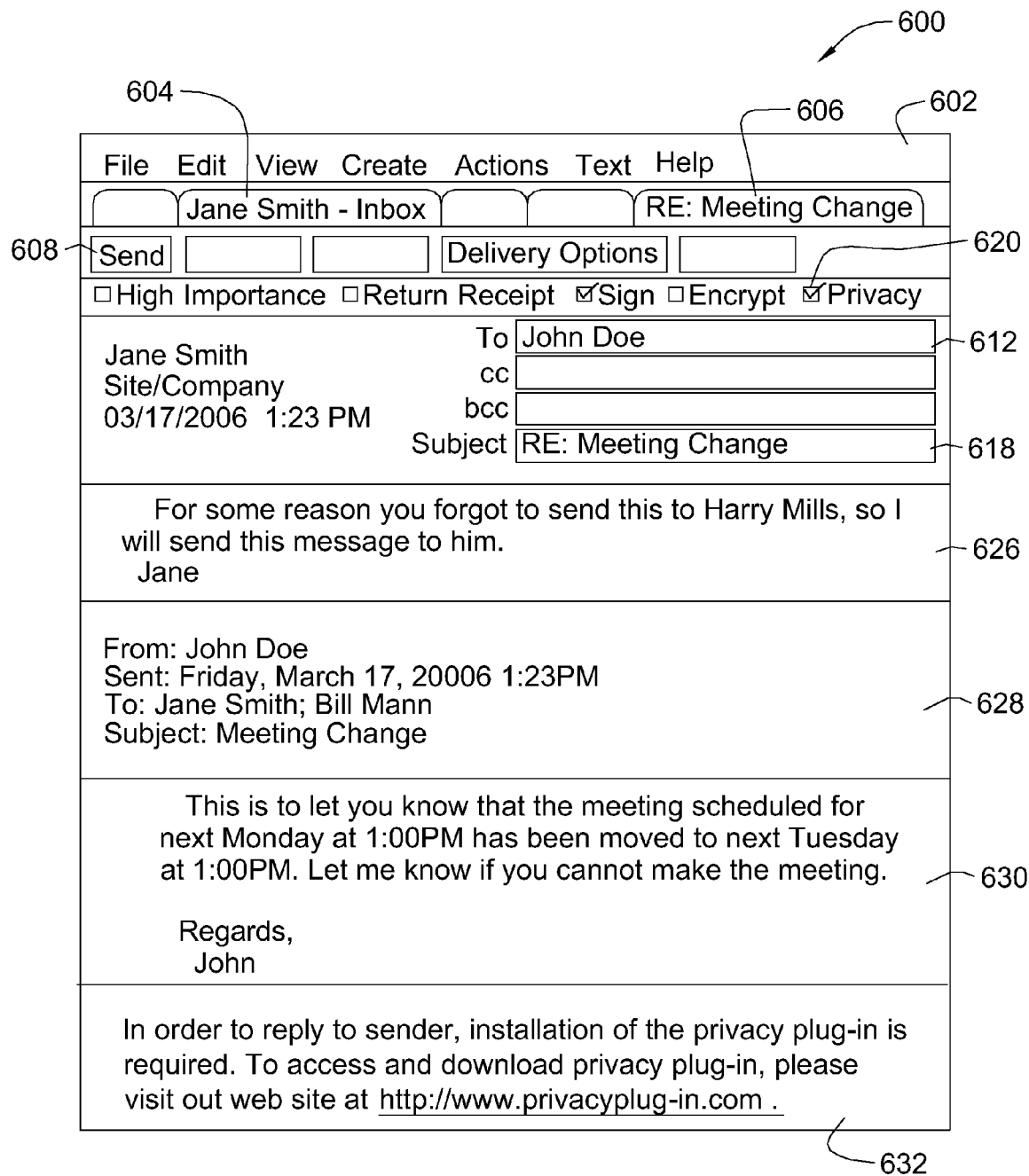
FIG. 6 is an illustration of a reply e-mail composition window or screen in an e-mail application when an intended recipient decides to reply to the sender of the e-mail message received in FIG. 5, in accordance with an embodiment of the present invention.

Turning to FIG. 6, reference numeral 600 shows the reply e-mail message composition window (as indicated by the "RE: Meeting Change" tab 606) in the intended recipient, Jane Smith's inbox, shown by the "Jane Smith—Inbox" tab 604. Also, the reply e-mail message screen 600 shows a Main Menu bar 602 at the top that contains the main menu items File, Edit, View, Create, Actions, Text and Help. Further, as shown in FIG. 6, the reply e-mail window 600 has a Send button 608 for sending a reply to the sender of the initial e-mail message received. In particular, as shown in the reply e-mail window 600, the recipient has generated a reply message (referred to as reference numeral 626) in the reply e-mail window 600. The reply e-mail message contains the original message (reference numeral 630) sent by the sender, John Doe, as well as provides additional e-mail message details in section 628 as to who (only the name and not the e-mail address of who sent the initial e-mail message (From), when the initial message was sent (Sent), the names of the initial intended recipients (To) and the title of the e-mail message (Subject). The reply composition window 600 also shows the privacy plug-in message 632 at the bottom. Furthermore, the privacy option is shown as being automatically selected as per the check mark shown in the box 620 labeled "Privacy", given that the recipient's e-mail client has been modified.

Figure 7:
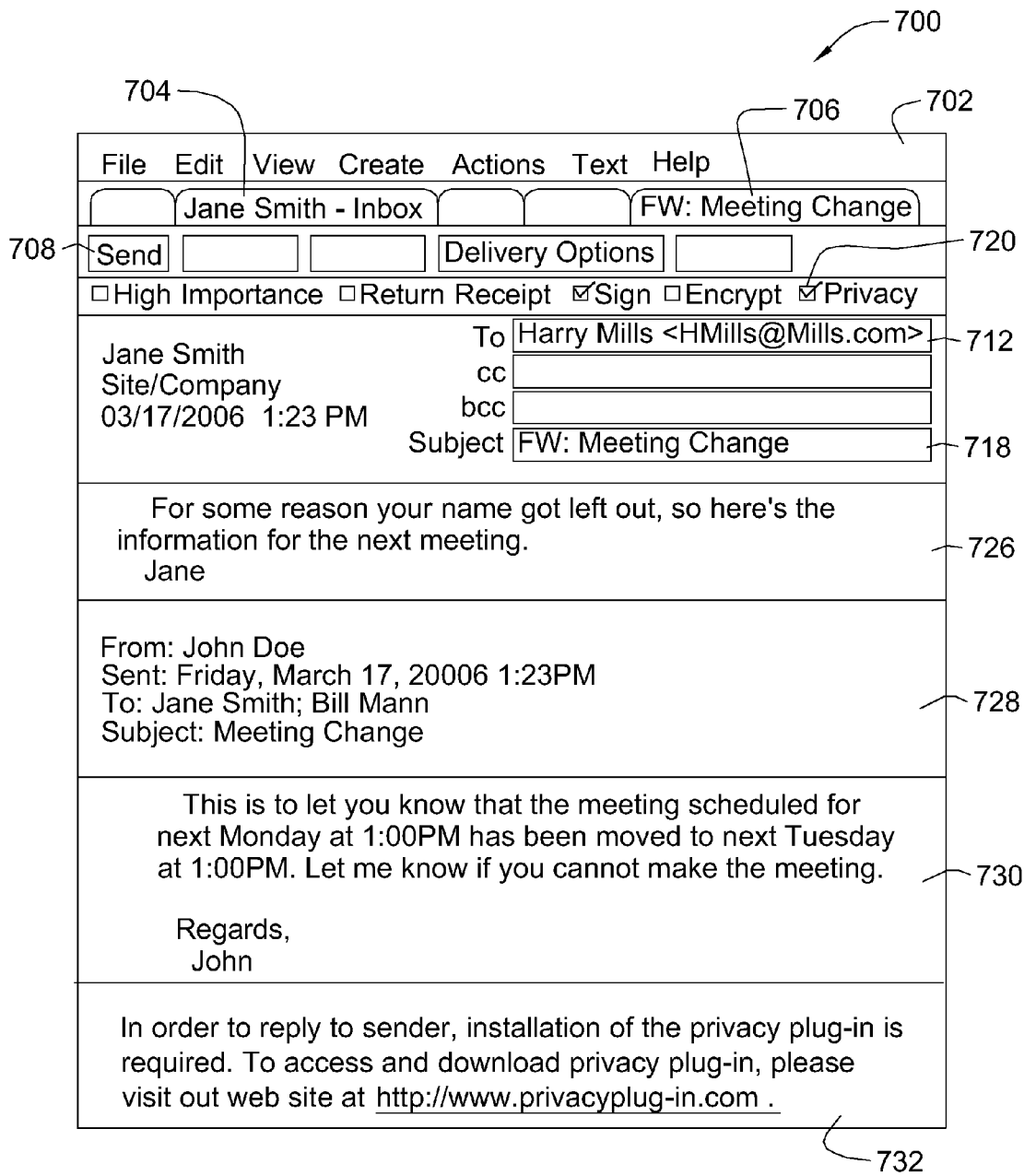
FIG. 7 is an illustration of a forward e-mail composition window or screen in an e-mail application when an intended recipient decides to forward the e-mail message received in FIG. 5 to an unintended recipient, in accordance with an embodiment of the present invention.

Further, referring to FIG. 5, the recipient, Jane can choose to forward the e-mail message received by selecting or clicking on the Forward button 510. When the recipient, Jane Smith selects the Forward option 510 shown in FIG. 5, the recipient is taken to a forward e-mail message screen 700, as shown in FIG. 7. Reference numeral 700 shows the forward e-mail message composition window (as indicated by the "FW: Meeting Change" tab 706) in the intended recipient, Jane Smith's inbox, shown by the "Jane Smith—Inbox" tab 704. Also, the reply e-mail message screen 700 shows a Main Menu bar 702 at the top that contains the main menu items File, Edit, View, Create, Actions, Text and Help. Further, as shown in FIG. 7, the reply e-mail window 700 has a Send button 708 for sending a reply to the sender of the initial e-mail message received. In particular, the forward e-mail window 700 shows that the intended recipient, Jane Smith, has entered or selected or specified in the To section 712 an unintended or new recipient (as shown by the name. Harry Mills), that is, a recipient that was not specified in the original e-mail message sent by the sender, John Doe. The Subject section 718 indicates that the message is being forwarded as per the title "FW: Meeting Change". Further, the intended recipient, Jane Smith has generated a forwarding message (referred to as reference numeral 726) for the unintended recipient, Harry Mills, in the forward e-mail window 700. In an embodiment, as shown in FIG. 7, the e-mail address (HMills@Mills.com) of the unintended recipient, Harry Mills, is shown in the To section 712. Alternatively, not shown in FIG. 7, the To section of the forward e-mail message window can instead only show or display the name of the unintended recipient, namely, Harry Mills and hide or not display the e-mail address of the unintended recipient. Furthermore, the forward e-mail message screen 700 provides the initial e-mail message details in section 728 as to who (only the name and not the e-mail address of who sent the initial e-mail message (From), when the initial message was sent (Sent), the names of the initial intended recipients (To) and the title of the e-mail message (Subject). In addition, the forward e-mail message window 700 contains the original e-mail message (reference numeral 730) sent by the sender, John as well as the hyperlink message (reference numeral 732) sent in the initial e-mail message received by the recipient. Jane Smith. Furthermore, in the forward e-mail message screen 700, the privacy option is shown as being automatically selected as per the check mark shown in the box 720 labeled "Privacy". As such, when the recipient, Jane Smith, forwards the e-mail message by selecting or clicking on the Send button 708 shown in FIG. 7, the privacy plug-in will automatically encrypt the e-mail address of the recipient sender, namely, Jane Smith, using the forwarding recipient's public key, in this example, Harry Mills' public key such that when the e-mail is forwarded to the unintended recipient (Harry Mills), the privacy plug-in will strip the initial sender's e-mail address, namely, John Doe's e-mail address, before transmitting the forward e-mail message in screen 700 to the unintended recipient, Harry Mills. Moreover, a recipient may send or forward the e-mail message received to a third party (unintended recipient), for instance, by copying and pasting the e-mail message received in a new e-mail composition window. However, in this case, the e-mail message that is forwarded to the third party would not contain the e-mail address of the sender nor the e-mail addresses of any of the other recipients identified in the original e-mail message, since the sender's and the other recipient's e-mail addresses have been stripped, as described herein above.

Once the privacy plug-in has been installed on each of the recipient's e-mail client, any of the intended recipients can reply to the sender's e-mail message or forward the e-mail message that is received as explained hereinabove with respect to FIGS. 5-7. In particular, the To section of the e-mail message received by any of the recipients specified in the original e-mail message does not display the e-mail addresses of any of the other recipients, only their names, given that the e-mail address of any of the other recipients (besides the recipient receiving the e-mail) has been stripped, such that one recipient specified in the initial e-mail is not able to reply to another recipient specified in the initial e-mail. Further, the privacy plug-in will automatically decrypt, for instance, using PKI cryptography, the e-mail address of the sender. For example, the e-mail that is sent to Jane Smith will have John's e-mail address encrypted and will have Bill's e-mail address stripped. As such, the privacy plug-in installed on Jane's e-mail client will decrypt John's e-mail address using Jane's private key. Thus, although the e-mail message received by Jane will show that Bill is the other recipient (by his name in the To section), the e-mail message will not display Bill's e-mail address and given that Bill's e-mail address is stripped, Jane will not be able to reply to Bill. Similarly, the e-mail that is sent to Bill Mann will have John's e-mail addresses encrypted, for instance, using PKI cryptography, and will have Jane's e-mail address stripped. As such, the privacy plug-in installed on Bill's e-mail client will decrypt John's e-mail address using Bill's private key. Thus, although the e-mail message received by Bill will show that Jane is the other recipient (by her name in the To section), the e-mail message will not display Jane's e-mail address and given that Jane's e-mail address is encrypted, thus, Bill will not be able to reply to Jane. Moreover, when an intended recipient chooses to forward the initial e-mail message to one or more unintended recipients, the e-mail address of the recipient sender is encrypted in the forwarded e-mail message (given that the recipient's e-mail client has been modified) before it is sent to the unintended recipient(s), thus, preventing any other additional unintended recipients to whom the forwarded e-mail message may be sent from sending an e-mail message back to the recipient sender, as well as the initial sender and any of the other recipients identified in the initial e-mail message. Again although an unintended recipient can see the name or names of the sender and the other recipients to whom the initial e-mail message was sent the unintended recipient will not be able to reply to either the sender or any of the other intended recipients.

Figure 8:
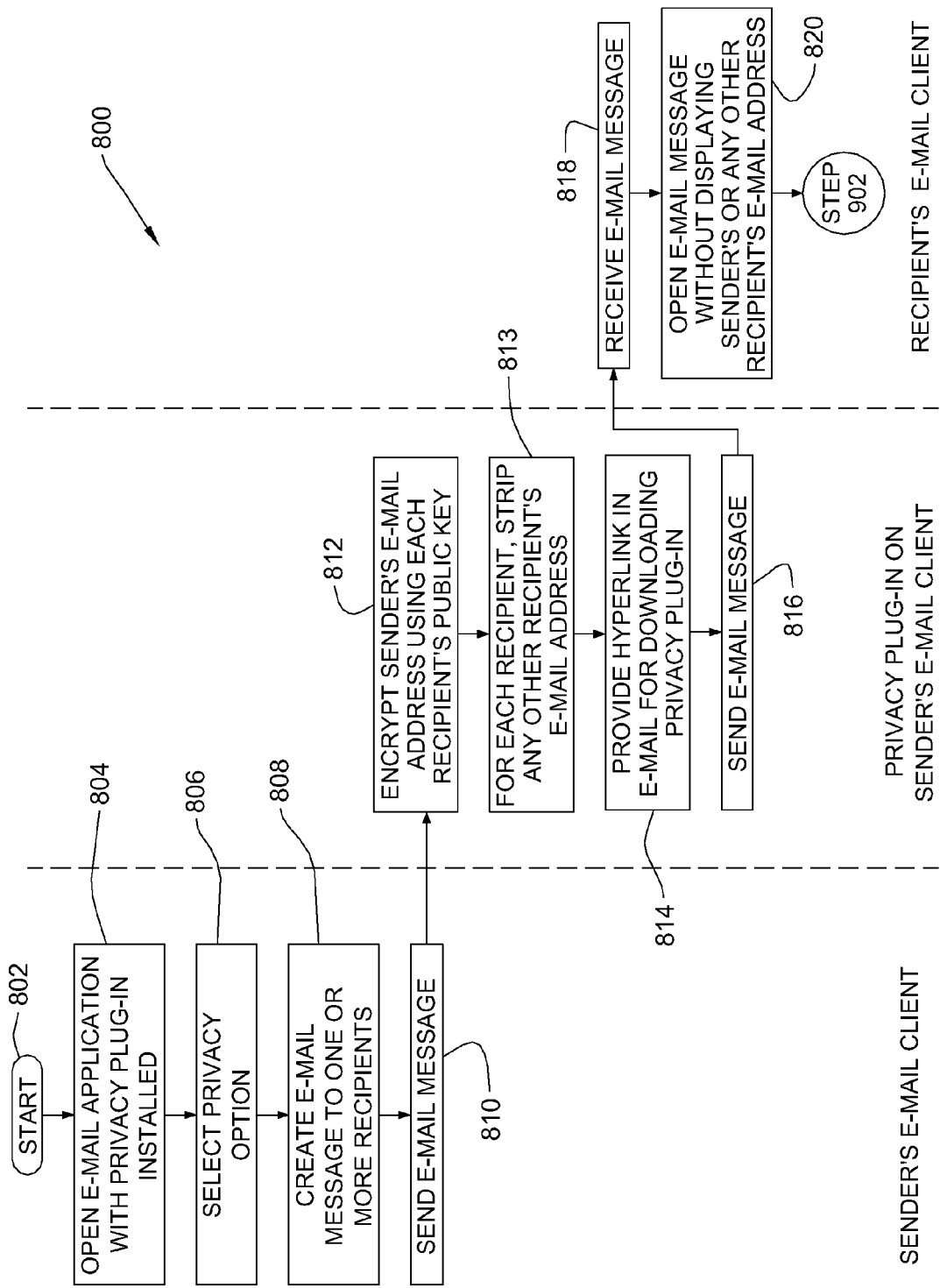
FIG. 8 is a flowchart depicting a method of securing privacy of a sender's e-mail address in an e-mail that is sent, in accordance with an embodiment of the present invention.
Figure 9:
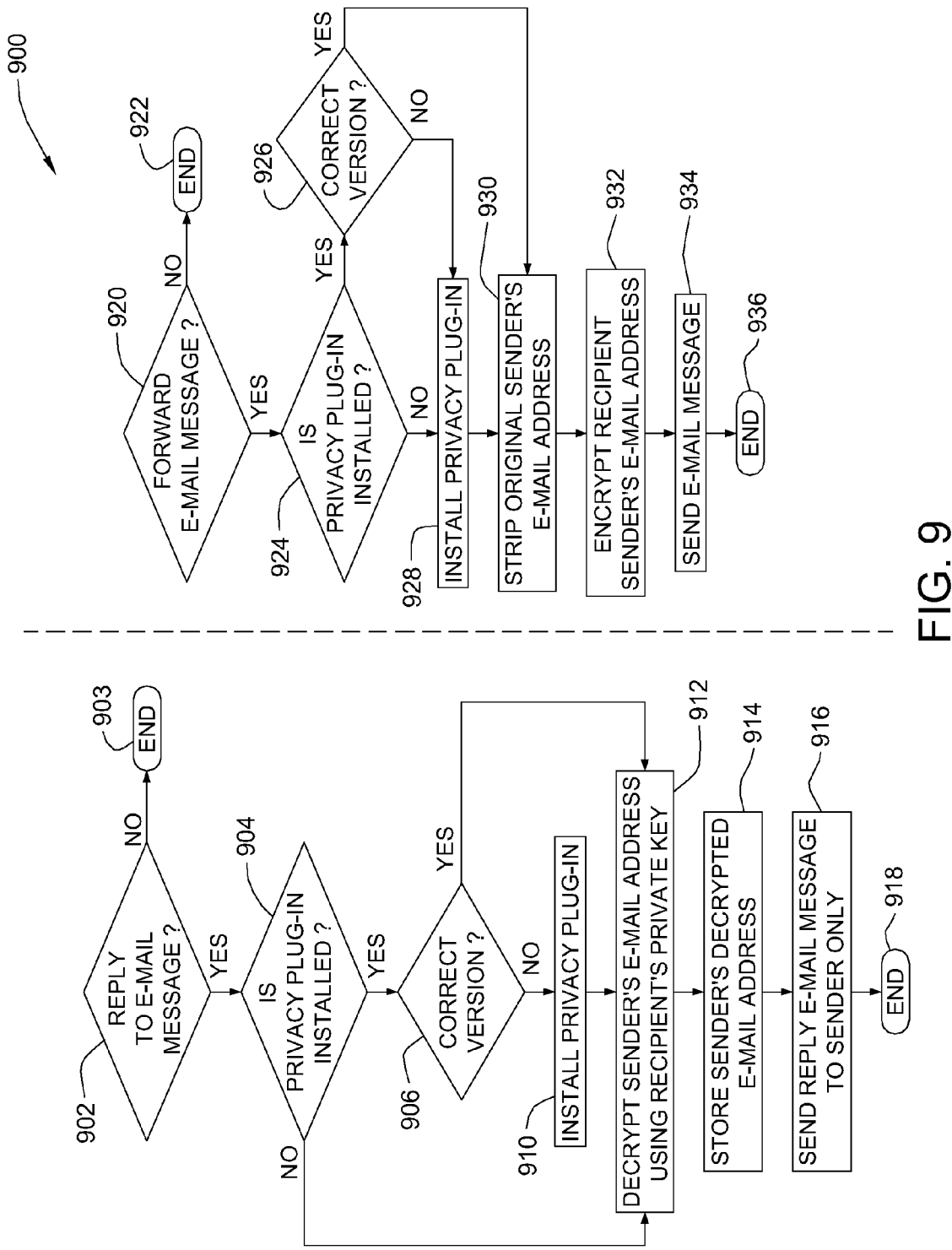
FIG. 9 is a flowchart depicting a method of either responding to a sender's e-mail or forwarding the e-mail message that is received by an intended recipient, in accordance with an embodiment of the present invention.

Reference is now made to FIGS. 8 and 9, which outline the steps involved in different aspects of securing privacy of an e-mail address in an e-mail message that is sent, in accordance with an embodiment of the invention. Turning to FIG. 8, numeral 800 outlines a method of securing privacy of an e-mail address in an e-mail message that is sent to one or more intended recipients. The method starts at step 802 with the sender opening in step 804 a new e-mail composition window in an e-mail application on the sender's e-mail client where the privacy plug-in has been installed. Next, in step 806, the privacy option is selected on the sender e-mail client for the e-mail message and in step 808 an e-mail message is created or generated on the sender e-mail client, the e-mail message being addressed to one or more intended recipients. The e-mail message is sent in step 810 to one or more of the intended recipients specified in the e-mail message created. Once the sender sends the e-mail message, for instance, by clicking on a send button on the sender's e-mail client, the privacy plug-in installed on the sender's e-mail client is launched. In step 812, the privacy plug-in on the sender's e-mail client encrypts the sender's e-mail address for the e-mail message that is to be sent to each of the intended or specified recipients. In particular, the privacy plug-in uses the public key corresponding to each recipient to whom the e-mail message is being sent to encrypt the sender's e-mail address. Further, in step 813, for each recipient that the e-mail message is being sent to, the privacy plug-in strips the e-mail address of any other recipients. Furthermore, in step 814, the privacy plug-in provides a hyperlink in the e-mail itself or alternatively in a transparent manner for downloading and installing the privacy plug-in on a recipient's e-mail client. The privacy plug-in sends the e-mail message in step 816 to each of the recipients specified in the e-mail message created. The e-mail message provides a hyperlink to the privacy plug-in which is sent by a sender e-mail client is received by a recipient e-mail client in step 818. The recipient's e-mail client opens in step 820 the e-mail message in the recipient's e-mail client without displaying the sender's e-mail address, but only the sender's name and, further, does not display any of the other recipient's e-mail addresses, only the names, as explained hereinabove with respect to FIGS. 5-7. The process on the recipient e-mail client is continued in step 902 of the flowchart 900 shown in FIG. 9.

As explained hereinabove, a recipient can choose to reply or forward the e-mail message that is received. The left hand side of FIG. 9 shows the steps carried out on a recipient e-mail client in replying to an e-mail message that is received, whereas, the right hand side of FIG. 9 shows the steps carried out on a recipient e-mail client in forwarding an e-mail message that is received. Turning first to the reply process in FIG. 9, in step 902, when a recipient chooses to reply to an e-mail message, a determination is made on the recipient e-mail client in step 904 to see whether or not the privacy plug-in is installed on the recipient e-mail client. If the privacy plug-in is not installed on the recipient e-mail client, the hyperlink provided in the e-mail message received prompts the recipient in order to be able to download and install the privacy plug-in in step 910. On the other hand, if the privacy plug-in has previously been installed on the recipient e-mail client, a determination is made in step 906 as to whether or not a correct version of the privacy plug-in has been installed. If a correct version is not installed on the recipient e-mail client, the hyperlink provided in the e-mail message received prompts the recipient to download and install the privacy plug-in in step 910. Moreover, after the privacy plug-in has been installed in step 910 or after a determination is made that the correct version of the privacy plug-in is installed, the privacy plug-in decrypts the sender's e-mail address using the recipient's private key in step 912. The privacy plug-in stores in step 914 the sender's decrypted e-mail address on the recipient's e-mail client, so that the sender's e-mail address can be inserted transparently when the reply e-mail message is sent to the sender only in step 916, ending the reply process in step 918. Alternatively, if instead of replying to the e-mail message in step 902, the recipient chooses to forward the e-mail message received as shown in step 920, a determination is made on the recipient e-mail client in step 924 to see whether or not the privacy plug-in is installed on the recipient e-mail client. If the privacy plug-in is not installed on the recipient e-mail client, the hyperlink provided in the e-mail message received prompts the recipient in order to be able to download and install the privacy plug-in in step 928. On the other hand if the privacy plug-in has previously been installed on the recipient e-mail client, a determination is made in step 926 as to whether or not a correct version of the privacy plug-in has been installed. If a correct version is not installed on the recipient e-mail client, the hyperlink provided in the e-mail message received prompts the recipient to download and install the privacy plug-in in step 928. Moreover, after the privacy plug-in has been installed in step 928 or after a determination is made in step 926 that the correct version of the privacy plug-in is installed, the privacy plug-in strips in step 930 the sender's e-mail address from the forwarded e-mail and the privacy plug-in encrypts in step 932 the e-mail address of recipient sender of the e-mail message being forwarded and then sends the e-mail message to be forwarded in step 934, ending the forward process at step 936. If the recipient chooses not to reply to the e-mail message in step 902, the process ends in step 903. Similarly, if the recipient chooses not to forward the e-mail message in step 920, the process ends in step 922.

In yet another embodiment, the invention provides a computer program product for securing privacy of a sender's e-mail address in an e-mail that is sent. The computer program product comprises a non-transitory computer readable or computer-usable medium, which provides program code for use by or in connection with a computer or any instruction execution system. For the purposes of this description, a computer-usable or non-transitory computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Further, preferably, network medium can comprise of transmission devices on a network, such as, cables, routers, switches and/or network adapter cards.

The computer program product further comprises first program instructions to create an e-mail addressed to one or more intended recipients in an e-mail application on an e-mail client, the first program instructions comprising instructions to select a privacy option using a privacy plug-in that is installed on the e-mail client for securing an e-mail address of a sender. The computer program product further comprises second program instructions to encrypt the e-mail address of the sender using a respective public key of each respective recipient of the one or more intended recipients before sending the e-mail to each respective recipient of the one or more intended recipients. In an embodiment, the second program instructions further comprise instructions to strip an e-mail address corresponding to each of any other intended recipients before transmitting the e-mail message to the respective recipient, and further include instructions to send a hyperlink to a website for automatically downloading and installing a correct version of the privacy plug-in corresponding to each respective recipient client being used by each respective recipient of the one or more intended recipients. The computer program product also comprises third program instructions to decrypt the e-mail address of the sender upon receipt of the e-mail by each respective recipient using a respective private key of each respective recipient of the one or more intended recipients. In an embodiment, the third program instructions comprise instructions to prompt each respective recipient e-mail client of each respective recipient of the one or more intended recipients to check if the correct version of the privacy plug-in is installed and, if not, to prompt each respective recipient to install the correct version of the privacy plug-in. Moreover, in an embodiment, the third program instructions comprise instructions to modify each respective recipient e-mail client corresponding to each respective recipient of the one or more intended recipients of the e-mail message, such that the e-mail address of the sender is stripped if the respective recipient forwards the e-mail message received to an unintended recipient. The computer program product further comprises fourth program instructions to store in a memory on each respective recipient client corresponding to each respective recipient of the one or more intended recipients, the e-mail address of the sender that is decrypted without displaying the e-mail address of the sender that is decrypted in the e-mail message received by each respective recipient. Preferably, each of the first, second, third and fourth program instructions are stored on the computer readable medium.

Figure 10:
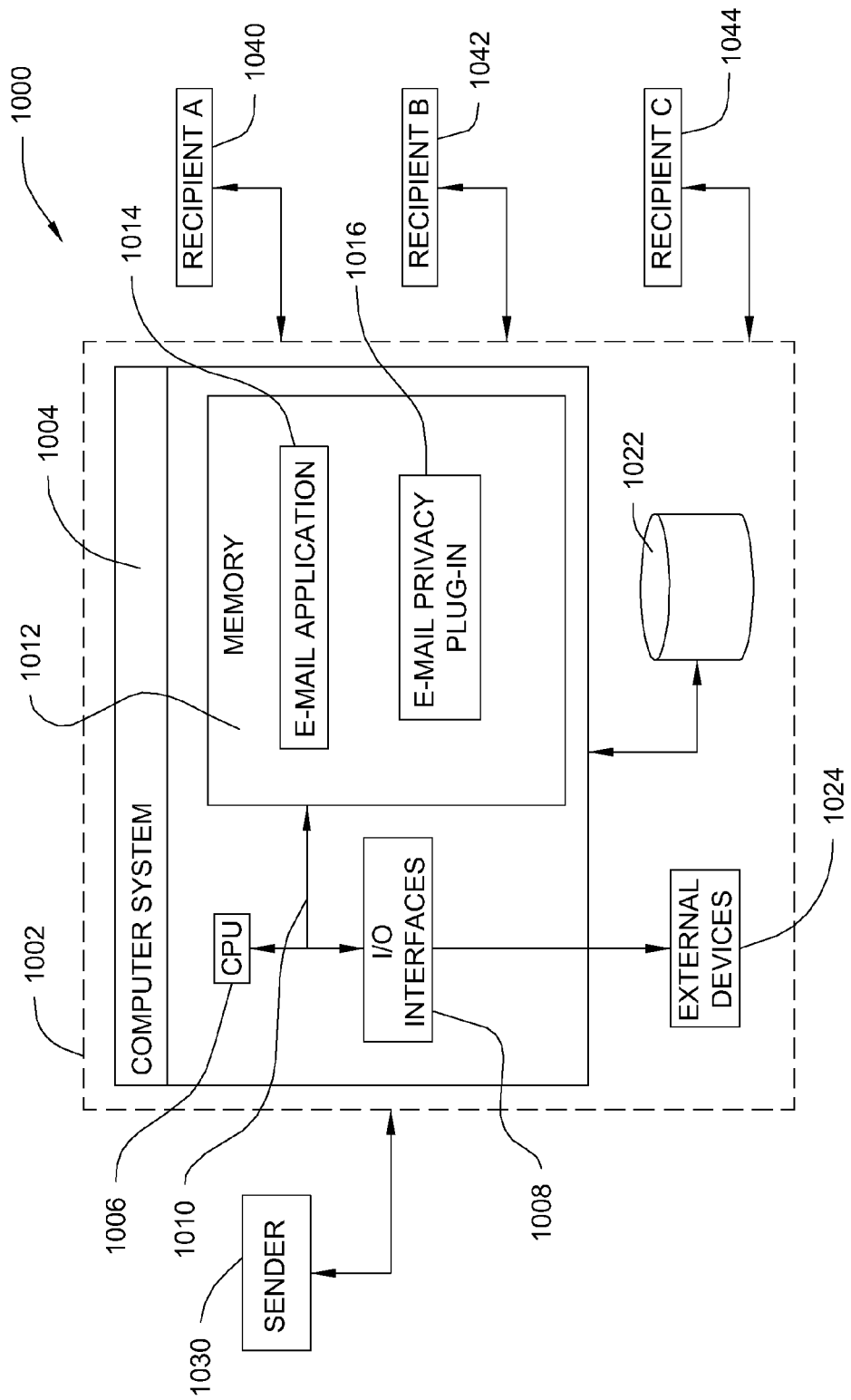
FIG. 10 is a schematic block system diagram illustrating a computer program product for securing privacy of a sender's e-mail address in an e-mail that is sent, in accordance with an embodiment of the present invention.

Referring now to FIG. 10, there is illustrated a system 1000 for securing privacy of a sender's e-mail address, according to the present invention. As depicted, system 1000 includes a computer infrastructure 1002, which is intended to represent any type of computer architecture that is maintained in a secure environment (i.e., for which access control is enforced). As shown, infrastructure 1002 includes a computer system 1004 that typically represents a server or the like. It should be understood, however, that although not shown, other hardware and software components (e.g., additional computer systems, routers, firewalls, etc.) could be included in infrastructure 1002.

In general, an originator or sender 1030 of an e-mail interfaces with infrastructure 1002 to secure privacy of the sender's e-nail address that is sent in an e-mail. Similarly, one or more Recipients A, B and C (designated by numerals 1040, 1042 and 1044) can interface with infrastructure 1002 for replying to a sender's e-mail message or for securing privacy of the recipients own e-mail address when forwarding an e-mail. To this extent, infrastructure 1002 provides a secure environment. In general, the parties could access infrastructure 1002 directly, or over a network via interfaces (e.g., web browsers) loaded on computerized devices (e.g., personal computers, laptops, handheld devices, etc. not shown in FIG. 10). In the case of the latter, the network can be any type of network such as the Internet, a local area network (LAN), a wide area network (WAN), a virtual private network (VPN), etc. In any event, communication with infrastructure 1002 could occur via a direct hardwired connection (e.g., serial port) or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 1002. It should be understood that under the present invention, infrastructure 1002 could be owned and/or operated by a party such as provider (not shown in FIG. 10), or by an independent entity. Regardless, use of infrastructure 1002 and the teachings described herein could be offered to the parties on a subscription or fee-basis. In either scenario, an administrator (not shown in FIG. 10) could support and configure infrastructure 1002.

Computer system 1004 is shown to include a CPU (hereinafter "processing unit 1006"), a memory 1012, a bus 1010, and input/output (I/O) interfaces 1008. Further, computer system 1000 is shown in communication with external (I/O devices/resources 1024 and storage system 1022. In general, processing unit 1006 executes computer program code, such as the E-mail Application 1014 and the E-mail Privacy Plug-in 1016, which is stored in memory 1010 and/or storage system 1022. While executing computer program code, the processing unit 1006 can read and/or write data, to/from memory 1012, storage system 1022, and/or I/O interfaces 1008. Bus 1010 provides a communication link between each of the components in computer system 1000. External devices 1024 can comprise any devices (e.g., keyboard, pointing device, display, etc.) that enable a user to interact with computer system 1000 and/or any devices (e.g., network card, modem, etc.) that enable computer system 1000 to communicate with one or more other computing devices.

Computer infrastructure 1002 is only illustrative of various types of computer infrastructures for implementing the invention. For example, in one embodiment, computer infrastructure 1002 comprises two or more computing devices (e.g., a server cluster) that communicate over a network to perform the various process steps of the invention. Moreover, computer system 1000 is only representative of various possible computer systems that can include numerous combinations of hardware. To this extent, in other embodiments, computer system 1000 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1006 may comprise a single processing unit, or be distributed across one or more processing units in one or more locations, e.g., on a client and server. Similarly, memory 1012 and/or storage system 1022 can comprise any combination of various types of data storage and/or transmission media that reside at one or more physical locations. Further, I/O interfaces 1008 can comprise any system for exchanging information with one or more external devices 1024. Still further, it is understood that one or more additional components (e.g., system software, math co-processing unit, etc.) not shown in FIG. 10 can be included in computer system 1000. However, if computer system 1000 comprises a handheld device or the like, it is understood that one or more external devices 1024 (e.g., a display) and/or storage system(s) 1022 could be contained within computer system 1000, not externally as shown.

Storage system 1022 can be any type of system (e.g., a database) capable of providing storage for information under the present invention. To this extent storage system 1022 could include one or more storage devices, such as a magnetic disk drive or an optical disk drive. In another embodiment, storage system 1022 includes data distributed across, for example, a local area network (LAN), wide area network (WAN) or a storage area network (SAN) (not shown). Although not shown, additional components, such as cache memory, communication systems, system software, etc., may be incorporated into computer system 1000.

In another embodiment the invention provides a process for deploying computing infrastructure comprises integrating computer-readable code into a computing system, wherein the code in combination with the computing system is capable of performing a process of securing privacy of an e-mail address. The process comprises installing a privacy plug-in on a sender e-mail client for securing an e-mail address, generating an e-mail message to one or more intended recipients in an e-mail application on the sender e-mail client, selecting a privacy option provided by the privacy plug-in installed on the sender e-mail client for securing the e-mail address of the sender and sending the e-mail message generated to one or more intended recipients, such that the e-mail address of the sender is encrypted using a respective public key corresponding to a respective recipient of the one or more intended recipients and an e-mail address corresponding to each of any other intended recipients is stripped before transmitting the e-mail message to the respective recipient. The process further comprises providing a hyperlink to a website for installing a correct version of the privacy plug-in on the respective recipient client for opening the e-mail message sent by the sender. Additionally, the process comprises decrypting, upon receipt by a respective recipient e-mail client corresponding to the respective recipient of the one or more intended recipients, the e-mail address of the sender, while hiding the e-mail address of the sender in the e-mail message that is received by the respective recipient of the one or more intended recipients. In an embodiment, the process further comprises modifying the respective recipient e-mail client corresponding to the respective recipient of the e-mail message sent, such that the e-mail address of the sender is stripped if the respective recipient forwards the e-mail message to an unintended recipient.

Accordingly, any of the components of the present invention as shown in FIG. 10 can be deployed, managed, serviced by a service provider who offers to secure privacy of an e-mail address in an e-mail message that is sent. Preferably, the invention provides a business method that performs the process steps of the invention on a subscription, advertising and/or fee basis. In particular, a service provider, such as a solution integrator could offer to secure privacy of an e-mail address in an e-mail message that is sent. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of securing privacy of a sender's e-mail address, said method comprising the steps of:
   generating an e-mail message to one or more intended recipients in an e-mail application on a sender e-mail client;
   encrypting, using a privacy plug-in installed on said sender e-mail client, an e-mail address of sender of said e-mail message generated, wherein the encrypting further comprises:
      selecting a privacy option for said e-mail message for securing said e-mail address of said sender; and
      launching said privacy plug-in installed on said sender e-mail client for encrypting said e-mail address of said sender before transmitting said e-mail message to said one or more intended recipients, wherein encrypting said e-mail address of said sender uses a respective public key corresponding to said respective recipient of said one or more intended recipients;
   transmitting said e-mail message generated with said e-mail address of said sender being encrypted to said one or more intended recipients, wherein said transmitting step further comprises hiding an e-mail address corresponding to each of any other intended recipients before transmitting said e-mail message to said respective recipient such that each respective intended recipient is unable to view said e-mail address of each of any other intended recipients; and
   decrypting, after receipt by a respective recipient e-mail client corresponding to a respective recipient of said one or more intended recipients, said e-mail address of said sender to display a name of said sender and any other recipients of said one or more intended recipients without displaying said e-mail address of said sender or said any other recipients of said one or more intended recipients in said e-mail message received by said respective recipient such that said respective recipient cannot reply to each of said any other recipients of said one or more intended recipients, the decrypting being executed by a privacy plug-in installed on said respective recipient e-mail client corresponding to a respective recipient of said one or more intended recipients.

2. The method according to claim 1, wherein said transmitting step further comprises the step of:
   sending a hyperlink to a web site for enabling an installation of a correct version of said privacy plug-in based on said respective recipient client being used by said respective recipient of said e-mail message transmitted.

3. The method according to claim 1, wherein said decrypting step further comprises the steps of:

checking whether said correct version of said privacy plug-in is installed on said respective recipient client corresponding to said respective recipient of said e-mail message transmitted; and if not, prompting said respective recipient to install said correct version of said privacy plug-in on said respective recipient client.

4. The method according to claim 3, wherein said decrypting step further comprises the step of:

decrypting, using a respective private key corresponding to said respective recipient of said one or more intended recipients, said e-mail address of said sender in said e-mail message received by said respective recipient client.

5. The method according to claim 4, wherein said decrypting step further comprises the step of:

storing said e-mail address of said sender that is decrypted in a memory on a respective recipient e-mail client, such that said e-mail address of said sender is hidden when said e-mail message is received by each of said one or more intended recipients.

6. A method of securing privacy of an e-mail address in an e-mail message, said method comprising the steps of:

installing a privacy plug-in on a sender e-mail client for securing an e-mail address;

generating an e-mail message to one or more intended recipients in an e-mail application on said sender e-mail client;

selecting a privacy option provided by said privacy plug-in installed on said sender e-mail client;

encrypting said e-mail address of said sender using a respective public key corresponding to each respective recipient of said one or more intended recipients;

sending said e-mail message generated to each respective intended recipient of said one or more intended recipients, such that said e-mail address of said sender is encrypted and an e-mail address of each of any other intended recipients identified in said e-mail message is hidden before said e-mail message is sent to said each respective intended recipient such that each respective intended recipient is able to view a name of each of any other intended recipients, and unable to reply to each of any other intended recipients or view said e-mail address of each of any other intended recipients; and generating, by said privacy plug-in, a hyperlink to a website for installing a correct version of said privacy plug-in on a respective recipient client corresponding to each of said one or more intended recipients for opening said e-mail message sent by said sender;

modifying said respective recipient e-mail client corresponding to said respective recipient of said e-mail message received, such that said e-mail address of said sender is stripped when said respective recipient forwards said e-mail message to an unintended recipient; and decrypting, after receipt by said respective recipient e-mail client corresponding to said respective recipient of said one or more intended recipients, said e-mail address of said sender using a respective private key corresponding to said respective recipient to display a name of said sender while hiding said e-mail address of said sender in said e-mail message received by said respective recipient, the decrypting being executed by a privacy plug-in installed on said respective recipient e-mail client corresponding to said respective recipient of said one or more intended recipients.

7. The method of claim 6, wherein said decrypting step further comprises the steps of:

checking whether said correct version of said privacy plug-in is installed on said respective recipient client corresponding to said respective recipient of said e-mail message transmitted; and if not, prompting said respective recipient to install said correct version of said privacy plug-in on said respective recipient client.

8. The method of claim 7, wherein said decrypting step further comprises the step of:

storing said e-mail address of said sender that is decrypted in a memory on a respective recipient e-mail client such that said respective recipient is able to reply to said sender of said e-mail message despite said e-mail address of said sender being hidden in said e-mail message received.

9. A computer program product for securing privacy of an e-mail address in an e-mail that is sent, said computer program product comprising:

a non-transitory computer readable medium;

first program instructions to create an e-mail addressed to one or more intended recipients in an e-mail application on an e-mail client, said first program instructions including instructions to select a privacy option using a privacy plug-in installed on said e-mail client for securing an e-mail address of a sender;

second program instructions to launch said privacy plug-in installed on said sender e-mail client to encrypt said e-mail address of said sender using a respective public key of each respective recipient e-mail client of said one or more intended recipients before sending said e-mail to said each respective recipient of said one or more intended recipients, wherein said second program instructions include instructions to hide an e-mail address corresponding to each of any other intended recipients before transmitting said e-mail message to said respective recipient such that said respective recipient is unable to view said e-mail address corresponding to each of any other intended recipients;

third program instructions to decrypt said e-mail address of said sender after receipt of said e-mail by said each respective recipient using a respective private key of said each respective recipient of said one or more intended recipients to display a name of said sender and any other recipients of said one or more intended recipients, while hiding said e-mail address of said sender and any other recipients of said one or more intended recipients in said e-mail message received by said one or more intended recipients such that said respective recipient cannot reply to each of said any other recipients of said one or more intended recipients, the decrypting being executed by a privacy plug-in installed on said each respective recipient e-mail client of said one or more intended recipients; and wherein said first, second and third program instructions are stored on said non-transitory computer readable medium.

10. The computer program product according to claim 9, further comprising:

fourth program instructions to store in a memory on each respective recipient client corresponding to said each respective recipient of said one or more intended recipients, said e-mail address of said sender that is decrypted without displaying said e-mail address of said sender that is decrypted in said e-mail message received by said each respective recipient, said fourth program instructions being stored on said non-transitory computer readable medium.

11. The computer program product according to claim 10, wherein said first program instructions include instructions to configure said privacy plug-in installed on said e-mail client to learn storage locations of each respective private key of one or more private keys corresponding to one or more respective recipients and to learn storage locations of each public key of one or more public keys corresponding to said one or more respective recipients.

12. The computer program product according to claim 11, wherein said second program instructions include instructions to send a hyperlink to a website for automatically downloading and installing a correct version of said privacy plug-in corresponding to said each respective recipient client being used by said each respective recipient of said one or more intended recipients, and wherein said hyperlink to said website is generated by said privacy plug-in.

13. The computer program product according to claim 12, wherein said third program instructions include instructions to prompt said each respective recipient e-mail client of said each respective recipient of said one or more intended recipients to check if said correct version of said privacy plug-in is installed and, if not, to prompt said each respective recipient to install said correct version of said privacy plug-in.

14. The computer program product according to claim 13, wherein said third program instructions include instructions to modify said each respective recipient e-mail client corresponding to said each respective recipient of said one or more intended recipients of said e-mail message, such that said e-mail address of said sender is stripped if said respective recipient forwards said e-mail message received to an unintended recipient.

15. A process for deploying computing infrastructure comprising integrating computer-readable code into a computing system, wherein said code in combination with said computing system is capable of performing a process of securing privacy of an e-mail address, said process comprising:
   installing a privacy plug-in on a sender e-mail client for securing an e-mail address;
   generating an e-mail message to one or more intended recipients in an e-mail application on said sender e-mail client;
   selecting a privacy option provided by said privacy plug-in installed on said sender e-mail client for securing said e-mail address of said sender;
   launching said privacy plug-in installed on said sender e-mail client for securing an e-mail application on said sender e-mail client;
   encrypting, using said privacy plug-in installed on said sender e-mail client, an e-mail address of said sender of said e-mail message generated;
   sending said e-mail message generated to said one or more intended recipients, such that said e-mail address of said sender is encrypted using a respective public key corresponding to a respective recipient of said one or more intended recipients and an e-mail address corresponding to each of any other intended recipients is stripped before transmitting said e-mail message to said respective recipient so that each of said one or more intended recipients is able to view a name of each of any other intended recipients, and unable to respond to each of any other intended recipients or view said e-mail address of each of any other intended recipients; and
   decrypting, after receipt by a respective recipient e-mail client corresponding to said respective recipient of said one or more intended recipients, said e-mail address of said sender to display a name of said sender, while hiding said e-mail address of said sender in said e-mail message that is received by said respective recipient of said one or more intended recipients, the decrypting being executed by a privacy plug-in installed on said respective recipient e-mail client corresponding to a respective recipient of said one or more intended recipients.

16. The process according to claim 15, further comprising the step of:
   generating, by said privacy plug-in, a hyperlink to a website for installing a correct version of said privacy plug-in on said respective recipient client for opening said e-mail message sent by said sender.

17. The process according to claim 16, further comprising the step of:
   modifying said respective recipient e-mail client corresponding to said respective recipient of said e-mail message sent, such that said e-mail address of said sender is stripped if said respective recipient forwards said e-mail message to an unintended recipient.

* * * * *